(12) United States Patent
Zheng et al.

(10) Patent No.: US 9,758,249 B2
(45) Date of Patent: Sep. 12, 2017

(54) PASSENGER SEAT TRAY TABLE

(71) Applicants: SINGAPORE TECHNOLOGIES AEROSPACE LTD, Paya Lebar (SG); TENRYU AERO COMPONENT CO., LTD., Kakamigahara, Gifu (JP)

(72) Inventors: Guo Ying Zheng, Paya Lebar (SG); Herng Huei Foong, Paya Lebar (SG); Teruo Sawada, Kakamigahara (JP)

(73) Assignees: Singapore Technologies Aerospace Ltd., Kaya Lebar (SG); Tenryu Aero Component Co., Ltd., Kakamigahara, Gifu (JP)

( * ) Notice: Subject to any disclaimer, the term of this patent is extended or adjusted under 35 U.S.C. 154(b) by 47 days.

(21) Appl. No.: 14/782,280

(22) PCT Filed: Apr. 5, 2013

(86) PCT No.: PCT/SG2013/000136
§ 371 (c)(1),
(2) Date: Oct. 2, 2015

(87) PCT Pub. No.: WO2014/163579
PCT Pub. Date: Oct. 9, 2014

(65) Prior Publication Data
US 2016/0039524 A1 Feb. 11, 2016

(51) Int. Cl.
*A47B 39/00* (2006.01)
*A47B 83/02* (2006.01)
(Continued)

(52) U.S. Cl.
CPC .......... *B64D 11/0638* (2014.12); *A47B 13/16* (2013.01); *B64D 11/06* (2013.01);
(Continued)

(58) Field of Classification Search
CPC ..... B64D 11/06; B64D 11/0638; A47B 13/16; A47B 23/043; B60N 3/004; B60N 3/00; B60N 3/001
(Continued)

(56) References Cited

U.S. PATENT DOCUMENTS 3,773,381 A * 11/1973 Brennan ................. A47C 7/70
108/45
6,354,658 B1 * 3/2002 Sher ..................... A61G 5/1094
248/918
(Continued)

FOREIGN PATENT DOCUMENTS

| CN | 201932044 U | 8/2011 |
| CN | 102858595 A | 1/2013 |

(Continued)

OTHER PUBLICATIONS

Office action dated Jun. 3, 2016 in corresponding Chinese Patent Application No. 201380077215.7, including English translation 16pp.
(Continued)

*Primary Examiner* — Chi Q Nguyen
(74) *Attorney, Agent, or Firm* — Lewis Roca Rothgerber Christie LLP

(57) ABSTRACT

A support structure for attachment to a tray table for a passenger seat, a tray table for a passenger seat, and a passenger seat. The support structure comprises a support arm shaped to substantially match at least a first portion of a peripheral contour of the tray table; and a connecting structure for connecting the support arm to the tray table in a manner such that the support arm is configurable into a stowed position in which the support arm extends substantially along said at least first portion of the peripheral contour of the tray table and at least one support position for supporting an item on the tray table in an angled orientation
(Continued)

between a surface of the item and the surface of the tray table.

20 Claims, 5 Drawing Sheets

(51) Int. Cl.
    *B64D 11/06*           (2006.01)
    *A47B 13/16*           (2006.01)
    *A47B 23/04*           (2006.01)
    *B60N 3/00*            (2006.01)

(52) U.S. Cl.
    CPC ............... *A47B 23/043* (2013.01); *B60N 3/00* (2013.01); *B60N 3/001* (2013.01); *B60N 3/004* (2013.01)

(58) Field of Classification Search
    USPC ............ 297/173, 174 R, 141, 148, 151, 163
    See application file for complete search history.

(56) References Cited

U.S. PATENT DOCUMENTS

| | | | |
|---|---|---|---|
| 6,679,468 B1 | 1/2004 | Hsu | |
| 6,805,403 B2* | 10/2004 | Buch | B60N 2/4879 |
| | | | 108/44 |
| 6,976,597 B2* | 12/2005 | Jahrling | F24C 15/168 |
| | | | 211/153 |
| 7,004,430 B2* | 2/2006 | Weekly | B60N 3/004 |
| | | | 16/248 |
| 7,500,716 B2 | 3/2009 | Guerin et al. | |
| 8,312,819 B2* | 11/2012 | Vignal | B60N 3/002 |
| | | | 108/143 |
| 8,934,063 B2* | 1/2015 | Boyer, Jr. | B64D 11/0015 |
| | | | 297/144 |
| 9,180,805 B2* | 11/2015 | Millan | B60N 3/004 |
| 9,499,083 B2* | 11/2016 | Nixon | B60N 3/004 |
| 2003/0184957 A1 | 10/2003 | Stahl et al. | |
| 2003/0230674 A1* | 12/2003 | Weekly | B60N 3/004 |
| | | | 244/129.1 |
| 2004/0217676 A1 | 11/2004 | Heuer et al. | |
| 2005/0178297 A1 | 8/2005 | Pipkin | |
| 2007/0283855 A1 | 12/2007 | Pozzi | |
| 2009/0174234 A1* | 7/2009 | Vignal | B60N 3/002 |
| | | | 297/163 |
| 2015/0061327 A1* | 3/2015 | Millan | B60N 3/004 |
| | | | 297/163 |
| 2015/0284090 A1* | 10/2015 | Stephens | B64D 11/0638 |
| | | | 297/163 |

FOREIGN PATENT DOCUMENTS

| | | |
|---|---|---|
| EP | 2 650 217 A1 | 10/2013 |
| WO | WO 2012/129116 A2 | 9/2012 |

OTHER PUBLICATIONS

Office action dated Nov. 22, 2016 in corresponding JP Patent Application No. 2016-506291, including English translation 6pp.
International Search Report for corresponding International Application No. PCT/SG2013/000136, dated Nov. 13, 2013, 4pp.
International Preliminary Report on Patentability for corresponding International Application No. PCT/SG2013/000136, dated Aug. 5, 2015, 7pp.

* cited by examiner

PASSENGER SEAT TRAY TABLE

CROSS-REFERENCE TO RELATED APPLICATIONS

This application is a national phase application under 35 U.S.C. §371 of International Application No. PCT/SG2013/000136, filed on Apr. 5, 2013, the disclosure of which is incorporated herein by reference in its entirety.

FIELD OF INVENTION

The present invention relates broadly to a support structure for attachment to a tray table for a passenger seat, to a tray table for a passenger seat, and to a passenger seat.

BACKGROUND

Passenger usage of personal electronics devices (PED), such as tablets and laptops, in lieu of built-in entertainment systems is becoming more ubiquitous. For example, an increasing number of passengers watch videos on their PEDs during travel by plane, bus, train, ferry etc. For travelers in economy-class-type seats, these devices are usually placed on the seat tray tables. However, extended usage of these devices in such conditions is usually not comfortable.

For example, comfort is compromised as the screen of the PED, typically folded up from a body of the PED, does not suit the passengers view angle. One factor is the limited fold-up range caused by the next row seat back, especially when the next row seat back is in a reclined position. Another factor is the overall limited distance of the passenger from the tray table, i.e. from the screen. Extended use in such a viewing position can cause neck and eye strain.

Embodiments of the present invention provide a support structure for attachment to a tray table for a passenger seat, a tray table for a passenger seat and a passenger seat that seek to address at least some of the above problems.

SUMMARY

In accordance with a first aspect of the present invention, there is provided a support structure for attachment to a tray table for a passenger seat, the support structure comprising a support arm shaped to substantially match at least a first portion of a peripheral contour of the tray table; and a connecting structure for connecting the support arm to the tray table in a manner such that the support arm is configurable into a stowed position in which the support arm extends substantially along said at least first portion of the peripheral contour of the tray table and at least one support position for supporting an item on the tray table in an angled orientation between a surface of the item and the surface of the tray table.

In accordance with a second aspect of the present invention, there is provided a tray table for a passenger seat, the tray table comprising a surface for placing items onto the tray table; and a connecting structure for connecting a support arm to the tray table such that the support arm is configurable into a stowed position in which the support arm extends substantially along at least a first portion of the peripheral contour of the tray table and at least one support position for supporting an item on the tray table in an angled orientation between a surface of the item and the surface of the tray table.

In accordance with a third aspect of the present invention, there is provided a passenger seat comprising a tray table of the second aspect.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 1:
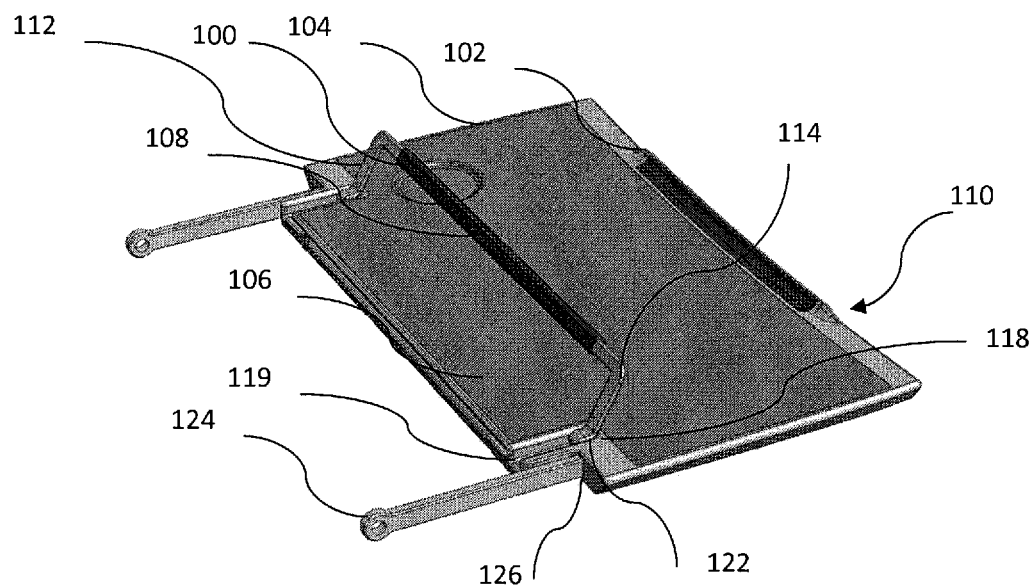
FIG. 1 shows a schematic drawing of one embodiment of the present invention.

FIG. 1 shows a schematic drawing of one embodiment of the present invention. A support arm 100 and corresponding lip 102 are integrated into a tray table 104. The support arm 100 can be folded into the tray table 104, keeping the top table surface 106 flush. The support arm 100 is covered with one or more anti-slip strips or sleeves 108. The lip 102 is provided at the aft edge 110 of the tray table 104. The lip 102 is a fixed raised lip in this example embodiment, but may be movable and adjustable in different embodiments. It is noted that the support arm 100 and optionally the lip 102 can either be pre-incorporated into the tray table 104 or installed as a modification onto an existing tray table.

Figure 2:
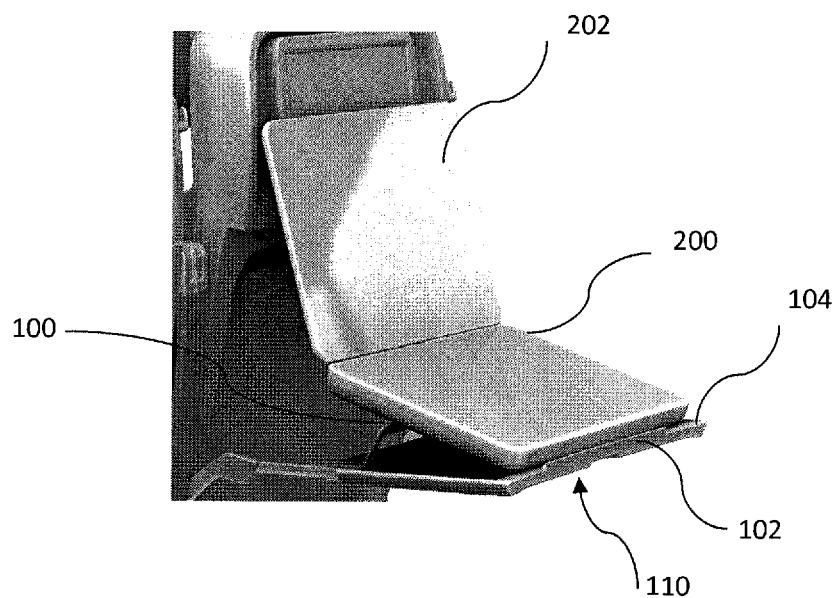
FIG. 2 shows a schematic drawing illustrating a use of the embodiment of FIG. 1.

As shown in FIG. 2, the support arm 100 allows a PED 200, for example a laptop computer, to be supported at an angle off the top surface 106 of the tray table 104, so that the height of the screen 202 is brought closer to the eye level of the passenger (not shown). Stability is preferably achieved through the integrated lip 102 on the edge 110 of the tray table 104, which can prevent the PED 200 from slipping off the tray table 104.

Returning to FIG. 1, in this embodiment, the support arm 100 is substantially U-shaped with a substantially flat profile covered with one or more non-slip sleeves 108. The shorter arms 112, 114 may be designed adjustable in length, to suit for different needs in view angle from passengers. A hinge mechanism is provided that stops in the off-centre position. In this embodiment, the hinge mechanism is implemented through design of the shape and orientation of the aft walls, e.g. 118, of recesses, e.g. 119, for receiving the arms 112, 114, through design of the profile of the arms 112, 114 in a mating portion thereof, and in co-operation with a fixed rotational axis configuration of the ends, e.g. 122, of the arms, e.g. 114, for example implemented as two pinned hinges (hidden) in the hinge recesses, e.g. 119, received in corresponding holes (hidden) formed at the ends, e.g. 122, of the arms, e.g. 114. Advantageously, the hinge mechanism can thus hold the position steadily and support the weight of the device, e.g. the PED 200 (FIG. 2). In such embodiments, the support arm 100 is held in place in the off-centre fold-up position towards the passenger (not shown) by the weight of the device, e.g. the PED 200 (FIG. 2) being supported.

In one embodiment, the tray table 104 is made from a solid shell material, such as molded PVC or Acrylic with a foam core, such as Polyurethane foam, for a light-weight implementation, with built-in recesses e.g. 119 for accommodating the arms 112, 114 in the stowed position, and the raised integrated lip 102 at the aft edge 110. In an alternative embodiment, a lip or stopper structure that extends telescopically away from the aft edge 110 of the tray table 104 can be provided. In yet another embodiment, an adjustable lip or stopper structure which can be retracted to be flush with the tray table 104 surface in a stowed position can be provided. In such embodiments, the retractable lip or stopper structure may be received in a stopper recess formed in the tray table 104 surface.

In this example embodiment, the tray table is provided with arms, e.g. 124, moveably received in corresponding slots, e.g. 126, formed on either side of the tray table 104. The arms are connectable to a frame structure (not shown) of a passenger seat (not shown). Alternatively, a frame structure may be integrated with the tray table for connection to a passenger seat. In one embodiment, the tray table can be provided with telescopic arms on either side of the tray table.

Figure 3A:
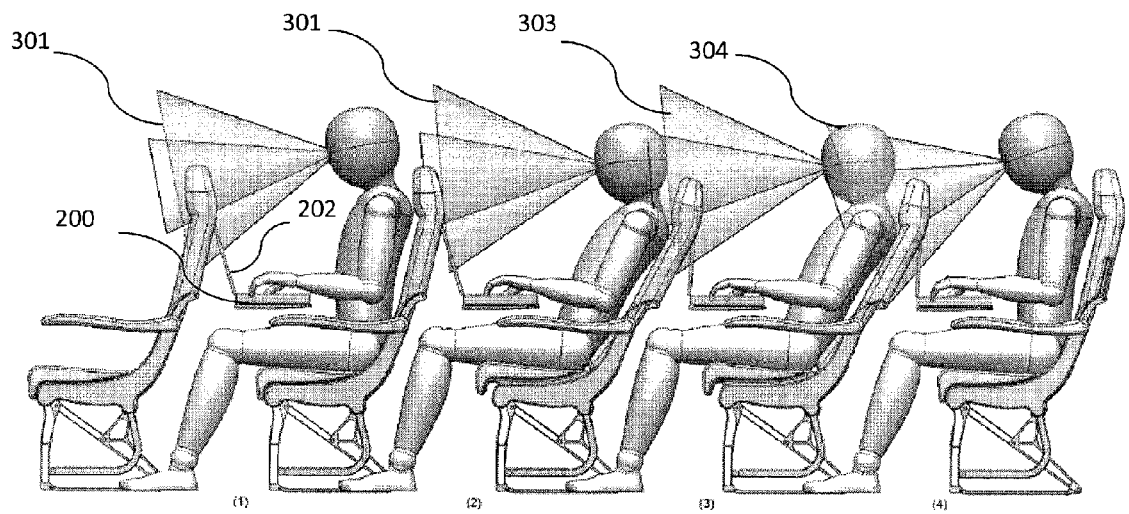
FIGS. 3a and b show schematic drawings illustrating a comparison of passenger viewing angles between a conventional tray table and the embodiment of FIG. 1.
Figure 3B:
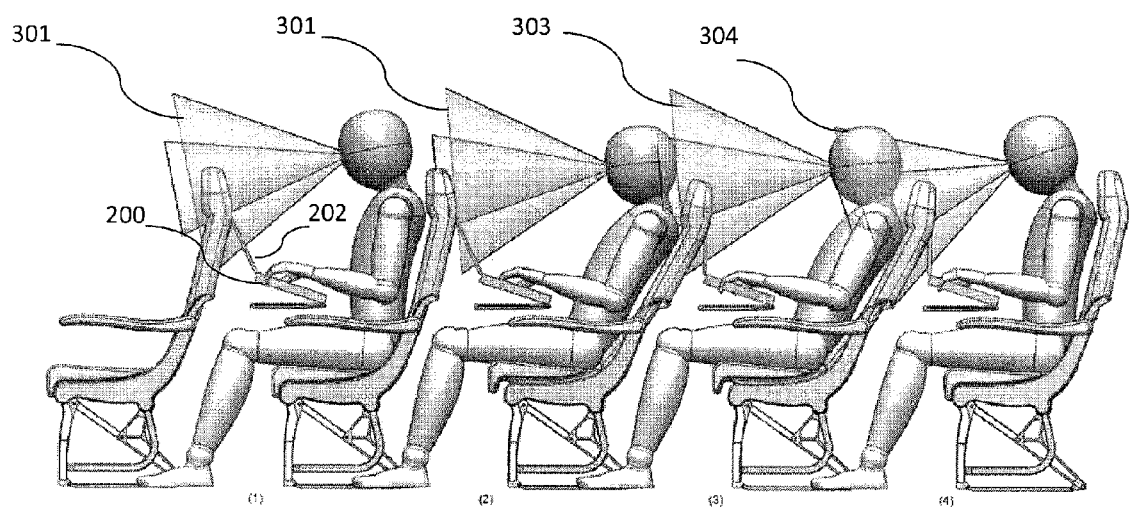

As illustrated in FIG. 2, with the support arm 100 in place under the device, e.g. the PED 200, the orientation of the screen 202 can be changed to preferably suit a passenger's desired view angle, while the center of the screen 202 is higher, compared to placing the PED 200 directly on the flat, substantially horizontal tray table 104 surface. As illustrated in a comparison of FIG. 3*a*) and *b*), the advantageous overall technical result is to provide better matching with passenger viewing angles 301-308 so that the passenger can preferably maintain a more comfortable head position while viewing the screen 202 of PED 200. In FIG. 2, the smaller cones 301-304 represent the 30 degree field of vision that can typically be achieved without movement of the eye or head. The larger cones 305-308 represent the 60 degree field of vision that can typically be achieved with full eye movement, but with the head held stationery.

Figure 4:
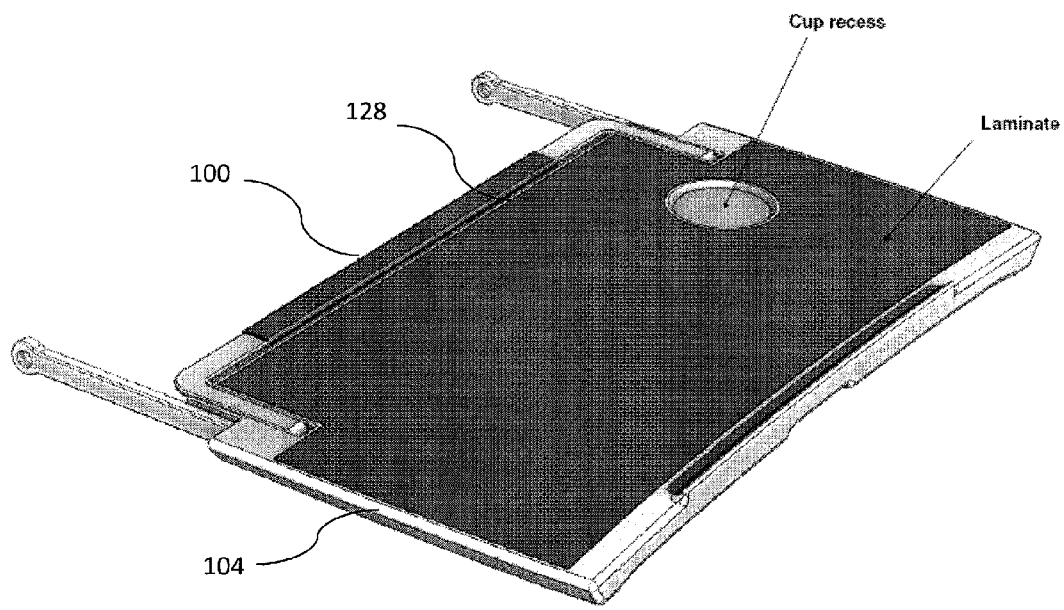
FIG. 4 shows a schematic drawing of the embodiment of FIG. 1 with the support arm stowed.

FIG. 4 shows a schematic drawing of the embodiment of FIG. 1 with the support arm 100 stowed. In this embodiment, the support arm 100 is configurable into a stowed position in which the support arm 100 extends substantially along the peripheral contour of the tray table 104 front edge 128, with the support arm 100 protruding the peripheral contour of the tray table 104 front edge 128.

Figure 5:
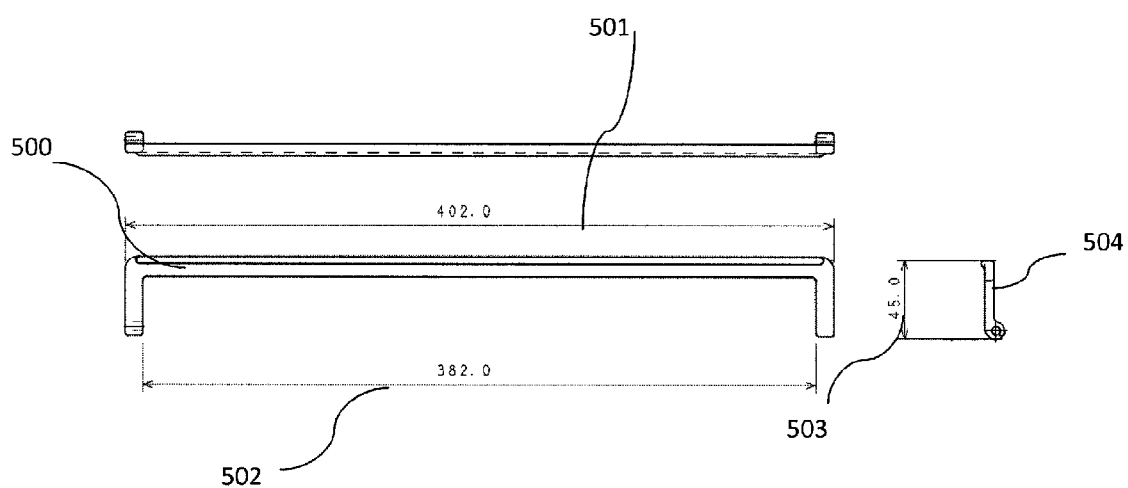
FIG. 5 shows a schematic drawing of another embodiment of the present invention.

As will be appreciated by a person skilled in the art, the dimensions of the support arm would depend on the dimensions of the tray table that it is to be used with, or integrated with. A possible, non-limiting implementation in one embodiment of the invention shown in FIG. 5 provides a support arm 500 with the a an outer width 501 of about 402 mm, an inner width 502 of about 382 mm, and an outer length 503 of the shorter arms 504 of about 45 mm.

To achieve different viewing angles in example embodiments, one embodiment preferably provides length adjustable short arms of the support arm, for example through the use of telescopic rods. In another embodiment, a lip or stopper structure that can move and lock at different positions along the surface of the tray table and/or beyond an aft edge of the tray table can alternatively or additionally be provided. In one embodiment shown in FIGS. 6*a* and *b*, a moveable stopper structure 600 can be implemented through the use of a beaded track type mechanism.

The stopper structure 600 comprises a pivotable flap 604 connected to one end of a beam 606, and the tray table 607 further comprises a slot 608 for receiving the beam 606, such that the flap 604 is positionable at different distances from the support arm 609. The flap 604 is configurable into a first position in which a tip portion of the flap 604 protrudes the surface of the tray table 607 and a second position in which the tip portion of the flap 604 is substantially flush with the surface of the tray table 607. The slot 608 in this embodiment comprises a beaded track (hidden) for adjustably receiving the beam 606 in different positions corresponding to different distances from the support arm 609, with holes e.g. 612 formed in the beam 606 for releasably receiving bead structures (hidden) of the beaded track (hidden) formed in the slot 608.

In such embodiments, to achieve multiple viewing angles, the flap 604 can slide and stop at specific positions along the top surface of the tray table 607 and/or beyond the aft edge of the tray table 607.

Figure 6A:
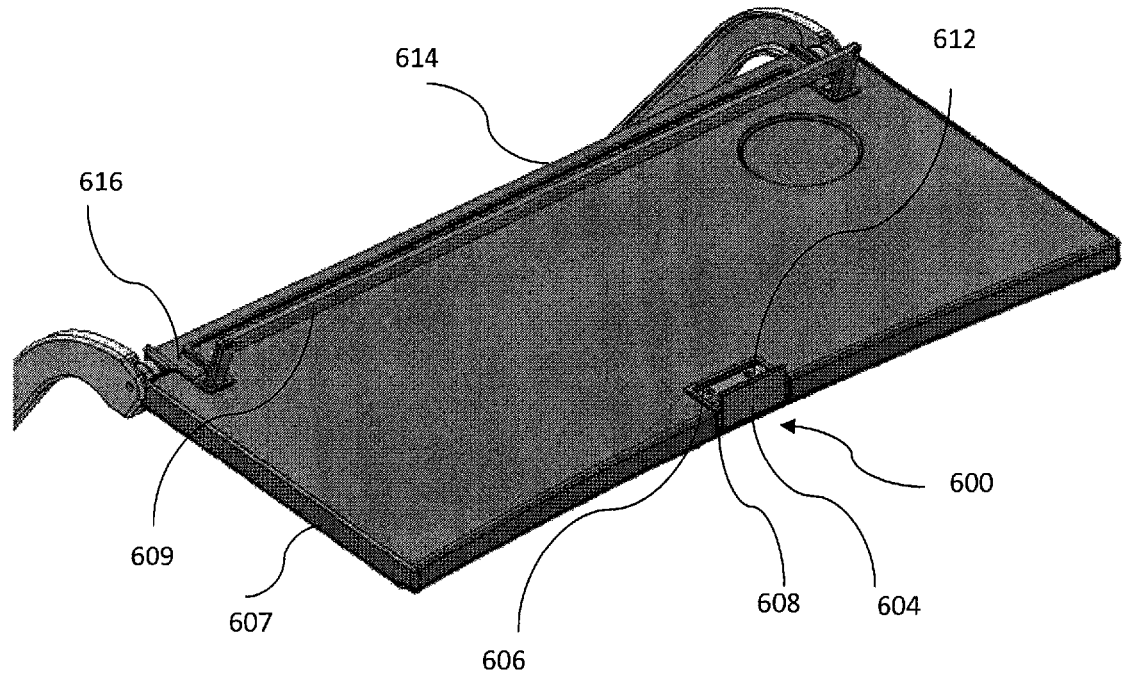
FIGS. 6a and b show schematic drawings of another embodiment of the present invention.
Figure 6B:
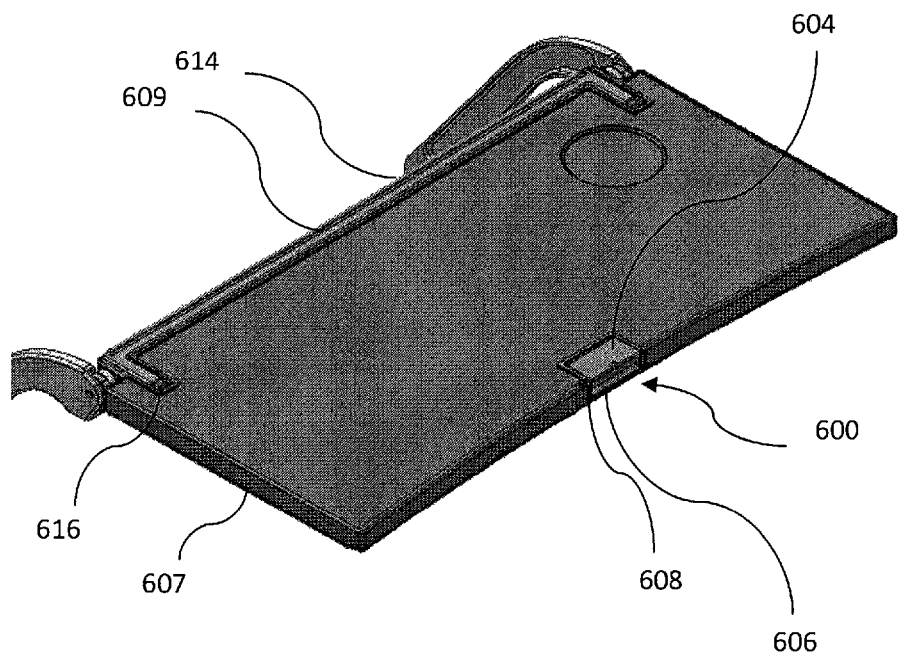

FIG. 6*a* shows the deployed support arm 609 stopping in an off-centre position. When stowed as shown in FIG. 6*b*, the support arm 609 is received in the arm recess 614, such that the top surface of the tray table 607 is substantially flat. The flatness of the surface of the tray table 607 is advantageously further enhanced through use of the stopper structure 600 with the adjustable flap 604 in the stowed position. In this embodiment, the support arm 609 is configurable into a stowed position in which the support arm 609 extends substantially along the peripheral contour of the tray table 607 front edge 614, with the support arm 609 received in an arm recess 616 formed in the tray table 607 surface.

Figure 7:
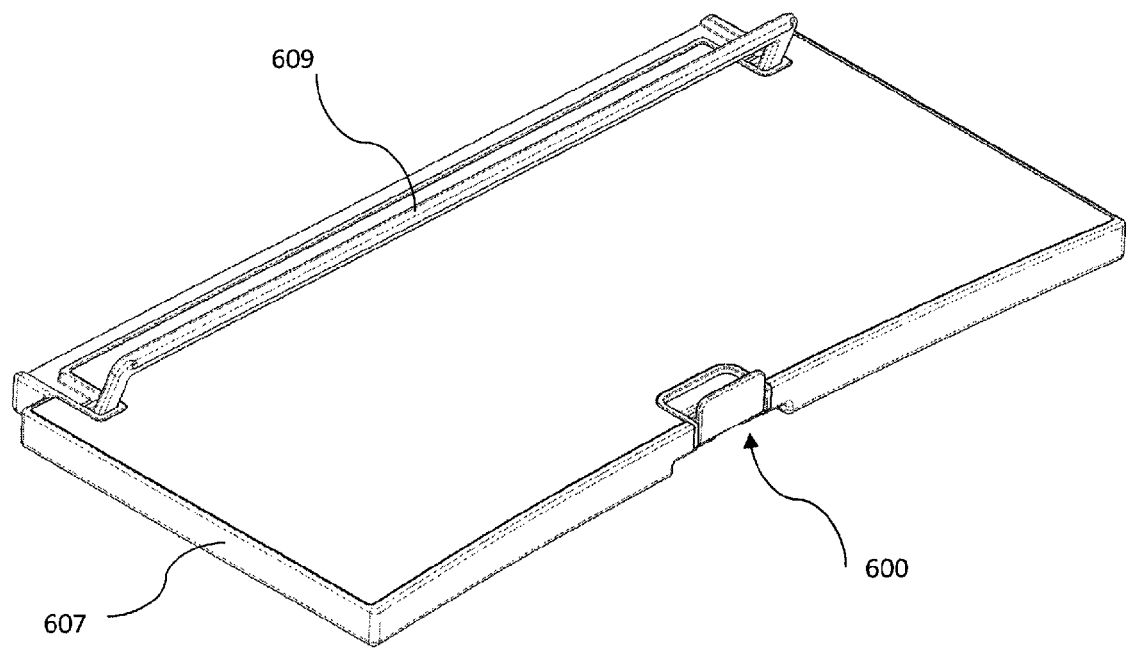
FIG. 7 shows a schematic line-art drawing of the embodiment of FIGS. 6a and b.

FIG. 7 shows a schematic line-art drawing of the tray table 607 with support arm 609 and stopper structure 600.

In an alternative embodiment, an adjustable lip or stopper structure which extends out from the aft edge of the tray table using a rail on either side of a stopper element such as a flap or lip portion can be provided. The flap or lip portion may be further adjustable between a protruding and a stowed position flush with the surface of the tray table.

In the embodiments described above, the neatness of the tray table is advantageously maintained, as the recess to stow the entire support arm or the recesses to store at least respective portions of the legs of the support arm, are located at the front edge of the tray table, and thus away from the passenger.

In implementations of the embodiments described above, the support arm can for example be made of plastic, carbon composites or aluminum, while aluminum fasteners and hinges can for example be used.

In one embodiment, a support structure for attachment to a tray table for a passenger seat is provided, the support structure comprising a support arm shaped to substantially match at least a first portion of a peripheral contour of the tray table; and a connecting structure for connecting the support arm to the tray table in a manner such that the support arm is configurable into a stowed position in which the support arm extends substantially along said at least first portion of the peripheral contour of the tray table and at least one support position for supporting an item on the tray table in an angled orientation between a surface of the item and the surface of the tray table.

The support arm can comprise a support portion disposed for contacting the surface of the item. The support portion can comprise means for enhancing friction between a surface of the support portion and the surface of the item.

In one embodiment, the connecting structure can comprise one or more leg portions extending from the support arm. The leg portions, in the stowed position, can substantially extend along at least respective second portions along the peripheral contour of the tray table. The leg portions can be adjustable between at least two different lengths. In the stowed position, the support arm can extends substantially along the at least first portion of the peripheral contour of the tray table with the leg portions in a first length configuration.

The connecting structure can be configured for disposing the support arm into two or more support positions.

In one embodiment, a tray table for a passenger seat is provided, the tray table comprising a surface for placing items onto the tray table; and a connecting structure for connecting a support arm to the tray table such that the support arm is configurable into a stowed position in which the support arm extends substantially along at least a first portion of the peripheral contour of the tray table and at least one support position for supporting an item on the tray table in an angled orientation between a surface of the item and the surface of the tray table.

The tray table may further comprise a stopper structure for abutting the item in the angled orientation between the surface of the item and the surface of the tray table. The stopper structure may comprise a stopper element disposed on the tray table, a tip portion of the stopper element protruding the surface of the tray table. A distance of the stopper element from the support arm can be adjustable. The stopper element can be configurable into a first position in which the tip portion of the stopper element protrudes the surface of the tray table and a second position in which the tip portion of the stopper element is substantially flush with the surface of the tray table. The stopper element can comprise a pivotable flap connected to one end of a beam element, and the tray table further comprises a slot for receiving the beam element, such that the flap is positionable at different distances from the support arm. The slot may comprise a beaded track for adjustably receiving the beam element in different positions corresponding to the different distances.

In one embodiment, the stopper structure can be disposed substantially opposite to the at least first portion of the contour of the tray table. The stopper structure can comprise means for enhancing friction between a surface of the stopper structure and a surface of the item.

In one embodiment, the tray table comprises a further connecting structure for connecting the tray table to the passenger seat.

In one embodiment, the tray table can comprise the support arm. The support arm can comprise a support portion disposed for contacting the surface of the item. The support portion can comprise means for enhancing friction between a surface of the support portion and the surface of the item. The connecting structure can comprise one or more leg portions extending from the support arm. The leg portions can be adjustable between at least two different lengths. In the stowed position, the support arm can extend substantially along the at least first portion of the peripheral contour of the tray table with the leg portions in a first length configuration.

In one embodiment, the surface of the tray table comprises one or more grooves for accommodating at least respective portions of the legs in the stowed position.

In one embodiment, the connecting structure can be configured for disposing the support arm into two or more support positions.

In one embodiment, the tray table can be configured to be connectable to an existing tray table support structure of the passenger seat.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A tray table for a passenger seat comprising:
 a surface for placing items onto the tray table;
 a support arm shaped to match at least a first portion of a peripheral contour of the tray table; and
 a connecting structure connecting the support arm to the tray table such that the support arm is configurable into a stowed position in which the support arm extends substantially along at least the first portion of the peripheral contour of the tray table and at least one support position for supporting an item on the tray table in an angled orientation between a surface of the item and the surface of the tray table;
 wherein the connecting structure comprises two leg portions extending from the support arm, and
 wherein, in the at least one support position, the two leg portions are leaning aft wards with respective ends of the two leg portions abutting respective aft walls of recesses formed in the surface of the tray table for holding the support arm in a fold-up position.

2. The tray table as claimed in claim 1, further comprising a stopper structure for abutting the item in the angled orientation between the surface of the item and the surface of the tray table.

3. The tray table as claimed in claim 2, wherein the stopper structure comprises a stopper element disposed on the tray table, a tip portion of the stopper element protruding the surface of the tray table.

4. The tray table as claimed in claim 3, wherein a distance of the stopper element from the support arm is adjustable.

5. The tray table as claimed in claim 2, wherein the stopper element is configurable into a first position in which the tip portion of the stopper element protrudes the surface of the tray table and a second position in which the tip portion of the stopper element is substantially flush with the surface of the tray table.

6. The tray table as claimed in claim 2, wherein the stopper structure is disposed substantially opposite to the at least first portion of the contour of the tray table.

7. The tray table as claimed in claim 2, wherein the stopper structure comprises means for enhancing friction between a surface of the stopper structure and a surface of the item.

8. The tray table as claimed in claim 1, wherein the tray table comprises a further connecting structure for connecting the tray table to the passenger seat.

9. The tray table as claimed in claim 1, wherein the support arm comprises a support portion disposed for contacting the surface of the item.

10. The tray table as claimed in claim 9, wherein the support portion comprises means for enhancing friction between a surface of the support portion and the surface of the item.

11. The tray table as claimed in claim 1, wherein the connecting structure comprises one or more leg portions extending from the support arm.

12. The tray table as claimed in claim 11, wherein the leg portions are adjustable between at least two different lengths.

13. The tray table as claimed in claim 12, wherein, in the stowed position, the support arm extends substantially along the at least first portion of the peripheral contour of the table portion with the leg portions in a first length configuration.

14. The tray table as claimed in claim 11, wherein the surface of the tray table comprises one or more grooves for accommodating at least respective portions of the legs in the stowed position.

15. The tray table as claimed ins claim 11, wherein, in the at least one support position, respective ends of the leg portions abut respective aft walls of recesses formed in the surface of the tray table for holding the support arm in a fold-up position.

16. The tray table as claimed in claim 1, wherein the connecting structure is configured for disposing the support arm into two or more support positions.

17. The tray table as claimed in claim 1, wherein the tray table is configured to be connectable to an existing tray table support structure of the passenger seat.

18. A passenger seat comprising a tray table as claimed in claim 1.

19. A tray table for a passenger seat comprising:
a surface for placing items onto the tray table;
a support arm shaped to match at least a first portion of a peripheral contour of the tray table;
a connecting structure connecting the support arm to the tray table such that the support arm is configurable into a stowed position in which the support arm extends substantially along at least the first portion of the peripheral contour of the tray table and at least one support position for supporting an item on the tray table in an angled orientation between a surface of the item and the surface of the tray table;
a stopper structure for abutting the item in the angled orientation between the surface of the item and the surface of the tray table,
wherein the stopper element is configurable into a first position in which the tip portion of the stopper element protrudes the surface of the tray table and a second position in which the tip portion of the stopper element is substantially flush with the surface of the tray table, and
wherein the stopper element comprises a pivotable flap connected to one end of a beam element, and the tray table further comprises a slot for receiving the beam element, such that the flap is positionable at different distances from the support arm.

20. The tray table as claimed in claim 19, wherein the slot comprises a beaded track for adjustably receiving the beam element in different positions corresponding to the different distances.

* * * * *